United States Patent
Pingel et al.

(10) Patent No.: US 7,155,449 B2
(45) Date of Patent: Dec. 26, 2006

(54) METHOD AND SYSTEM FOR CREATING A REFERENCE DATABASE FOR A COMPUTER-READABLE DOCUMENT

(75) Inventors: Jürgen Pingel, Geesthacht (DE); Oliver Specht, Oststeinbek (DE); Frank Loehmann, Norderstedt (DE); Lutz Höger, Hamburg (DE)

(73) Assignee: Sun Microsystems, Inc., Santa Clara, CA (US)

( * ) Notice: Subject to any disclaimer, the term of this patent is extended or adjusted under 35 U.S.C. 154(b) by 581 days.

(21) Appl. No.: 09/728,783

(22) Filed: Nov. 30, 2000

(65) Prior Publication Data

US 2001/0003818 A1 Jun. 14, 2001

(30) Foreign Application Priority Data

Dec. 14, 1999 (EP) .................................. 99124954

(51) Int. Cl.
G06G 17/30 (2006.01)
(52) U.S. Cl. .................. 707/102; 707/104.1; 715/515; 715/537
(58) Field of Classification Search ................ 707/1–7, 707/102, 104.1, 200, 201, 205; 715/500.1, 715/515, 537
See application file for complete search history.

(56) References Cited

U.S. PATENT DOCUMENTS

| | | | |
|---|---|---|---|
| 5,097,418 A * | 3/1992 | Nurse et al. ................ 715/537 |
| 5,535,382 A | 7/1996 | Ogawa ........................ 707/500 |
| 5,544,320 A * | 8/1996 | Konrad ....................... 709/203 |
| 5,581,753 A * | 12/1996 | Terry et al. .................. 707/201 |
| 5,675,788 A * | 10/1997 | Husick et al. ........... 707/104.1 |
| 5,832,476 A * | 11/1998 | Tada et al. ..................... 707/2 |
| 5,867,678 A * | 2/1999 | Amro et al. ................. 345/786 |
| 6,182,091 B1 * | 1/2001 | Pitkow et al. ............ 715/501.1 |
| 6,209,004 B1 * | 3/2001 | Taylor ........................ 715/500 |
| 6,289,342 B1 * | 9/2001 | Lawrence et al. ............. 707/7 |
| 6,449,616 B1 * | 9/2002 | Walker et al. ................ 707/10 |
| 6,505,196 B1 * | 1/2003 | Drucker et al. ................ 707/5 |
| 6,507,858 B1 * | 1/2003 | Kanerva et al. ............ 715/515 |
| 6,529,911 B1 * | 3/2003 | Mielenhausen ............. 707/100 |
| 6,606,633 B1 * | 8/2003 | Tabuchi ...................... 707/102 |
| 6,728,725 B1 * | 4/2004 | Garfield et al. ............. 707/102 |

OTHER PUBLICATIONS

Lawrence et al., Indexing and Retreval of Scientific Literature, ACM, 1999, pp. 139-146.*
House et al., Trust and Epistemic Communities in Biodiversity Data Sharing, ACM, Jul. 2002, pp. 231-239.*
"Method to Use Bibliographic References in Bookmaster", IBM Technical Disclosure Bulletin, vol. 33, No. 10A, Mar. 1991, pp. 108-109, XP000109980.

* cited by examiner

Primary Examiner—Leslie Wong
(74) Attorney, Agent, or Firm—Gunnison, McKay & Hodgson, L.L.P.; Forrest Gunnison (57) ABSTRACT

A reference database containing, for example, bibliographic data of a computer-readable document like a text document is stored together with the text document in a single data file. The reference data are therefore always accessible for the user of the document.

24 Claims, 7 Drawing Sheets

| | Journal | Book | Web Page | Conference Presentation | Author | Title | Year | Editor | Publishing Company | Date | Volume | | | Number of Citations |
|---|---|---|---|---|---|---|---|---|---|---|---|---|---|---|
| | { 401 | { 402 | { 403 | { 404 | | | | | | | | | | { 405 |
| 1 | 1 | 0 | 0 | 0 | Smith, John | Interact... | 1996 | — | — | 24-07 | 57 | | | 5 |
| 2 | 0 | 1 | 0 | 0 | Lee, Richard | Neurob... | 1987 | | blue press | 28-02 | — | | | 1 |
| 3 | | | | | | | | | | | | | | |
| 4 | | | | | | | | | | | | | | |
| 5 | | | | | | | | | | | | | | |
| 6 | | | | | | | | | | | | | | |

METHOD AND SYSTEM FOR CREATING A REFERENCE DATABASE FOR A COMPUTER-READABLE DOCUMENT

BACKGROUND OF THE INVENTION

1. Field of the Invention

The invention relates to the management of reference data like bibliographic data relating to a computer-readable document, e.g., a text document.

2. Description of the Related Art

Some types of text documents, in particular scientific papers or the like, contain a large amount of reference data like bibliographic data, footnotes, hyperlinks, etc. With some text documents inputting, handling, and editing the reference data requires a large portion of the time and work needed to create the text document. In some cases, the handling of bibliographic data is even more time consuming than generating the text data itself.

With word processing application programs, it is known to insert bibliographic data of every reference document or footnote by typing every reference separately. The bibliographic data is then treated and stored by the word processing program as text data having a different character font and format. Most word processing programs are able to correctly handle the position and order of the bibliographic data when the text data is edited. The writing and editing of the bibliographic data, however, is awkward and time consuming.

Therefore, it was proposed to create a separate database for bibliographic data. When a new reference was inserted in the text document, a reference field pointed to a respective entry in the database. With such a separate database writing and editing the bibliographic data was facilitated, in particular if references were cited several times in the same document. Moreover, the format of the citations was determined centrally in the database and so did not need to be input separately for every new citation.

If the text document was copied to a different storage medium, for example the disk memory of a laptop computer, however, the problem arose that the bibliographic database, which was stored as a separate data file was not available on the storage medium, on which the text document had been copied. Therefore, the user of the laptop computer was able to edit the text data, but not the bibliographic data.

SUMMARY OF THE INVENTION

In accordance with the present invention the above problem has been solved by a method of creating a reference database for a computer-readable document, comprising entering inputted reference data into the database, and storing the reference database with other data of the computer-readable document, e.g. text data, in a single data file, sometimes called a document file.

Since the document file contains the text data and the reference data in a single file, the user can always edit the text data as well as the reference data, and only one document needs to be transferred to another storage medium or remote device.

The reference database contains fields for different types of data sources. These data sources include, for example in the case of a bibliographic database, books, journals, conference papers, web pages, e-mails, etc. For every type of data source, there are fields for inputting specific information relating to this particular data source. The database may comprise one field with information about how often a specific reference is cited in the text document.

Preferably, the reference data is input using an interactive dialogue window displayed on a display screen of a display unit. This allows simple entry of the reference data by the user. The reference data, however, may also be imported from or synchronized with an external data source, e.g., over the Internet.

In one embodiment of the invention, there is provided an apparatus for creating a reference database for a computer-readable document, comprising a unit for entering inputted reference data into the database, and a memory medium storing the reference database together with other data of the computer-readable document in a single data file on a storage medium.

In another embodiment of the invention, there is provided a storage medium having stored thereon in a single data file a computer-readable document including a reference database for the document.

In yet another embodiment of the invention, there is provided an information signal encoding a computer-readable data file including a document and a reference database related to the document.

As a still further embodiment of the invention, there is provided a computer program for creating a reference database for a computer-readable document, the computer program comprising program code adapted for entering inputted reference data into the database, and for storing the reference database together with other data of the computer-readable document in a single data file.

This program code may be embodied in any form of a computer program product. A computer program product comprises a medium configured to store or transport computer-readable code, or in which computer-readable code may be embedded. Some examples of computer program products are CD-ROM discs, ROM cards, floppy discs, magnetic tapes, computer hard drives, servers on a network and signals transmitted over a network representing computer-readable program code.

According to one embodiment of the present invention, one single document file contains both the computer-readable document and the reference information, which can be edited by the user. This is in particular advantageous when the text document is large and contains a large volume of bibliographic data and when more than one author, e.g. at remote locations, work on the same text document. Moreover, the reference data can be exchanged or synchronized easily with local or external databases, for example via the Internet.

DETAILED DESCRIPTION

Figure 1A:
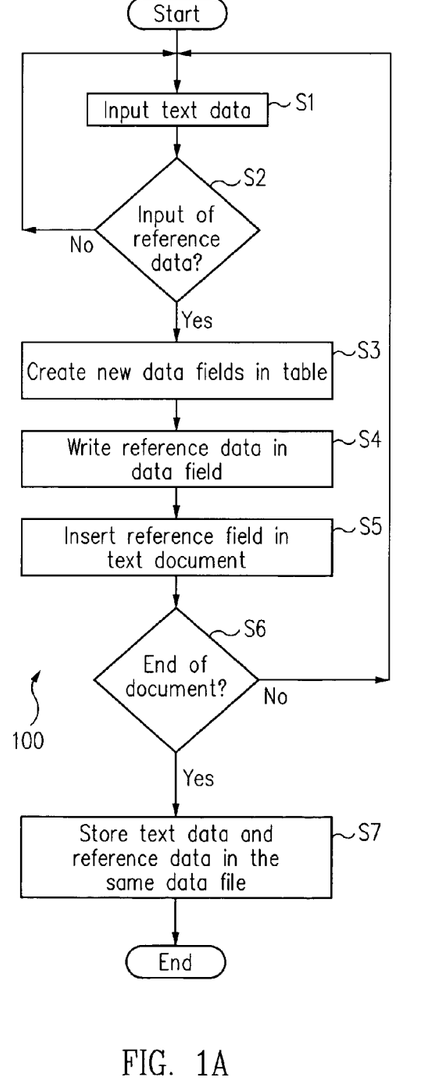
FIG. 1A is a flow chart illustrating the generation of a reference database of a text document containing bibliographic data according to the present invention.

FIG. 1A is a process flow diagram illustrating one embodiment of a method 100 for creating a reference database for a computer-readable document (FIGS. 1A and 2) where, according to the principles of this invention, the reference database is included with the computer-readable document in a single document file 250. The computer-readable document contains at least text data and at least one reference to reference data that is included in the reference database, but it is understood that this document can also contain further data including, for example, graphics, tables, user defined fields and so on. The computer-readable document stored in document file 250 may be, for example, a Hypertext Markup Language (HTML) document, or an eXtensible Markup Language (XML) document.

In operation S1, a user inputs text data using, for example, a keyboard 220 (See FIG. 2) of a computer system 200, which is representative of a computer system input device. The text data, however, can be input using another suitable input technique and/or input device, e.g. voice processing or the like.

In input reference data check operation S2, the computer program including method 100 and executing on central processing unit (CPU) 212 awaits an instruction on whether the user desires to input reference data, for example, bibliographic data. If the instruction is not received, the program returns to operation S1 allowing the user to input further text data.

As those of skill in the art will appreciate, operations S1 and S2 are illustrative only and are not intended to limit the invention to the specific sequence shown. Those of skill will further understand that operations S1 and S2 can be implemented in a wide variety of ways. For example, operation S2, in one embodiment, is part of an event handler and is called when the user takes an action with an input device other than text entry, e.g., selecting a menu item or hitting a predefined function key or a predefined key combination.

If the result in operation S2 is yes, a new data field in a reference database table, which is described in detail with reference to FIG. 4 below, is created in operation S3. The bibliographic data is written in operation S4 into the newly created data field. In one embodiment, bibliographic data is entered by the user using a user interactive dialogue window 500, as illustrated in FIG. 5, which is displayed on display unit 221. The user simply enters the appropriate bibliographic information in each portion of interactive dialogue window 500.

Figure 2:
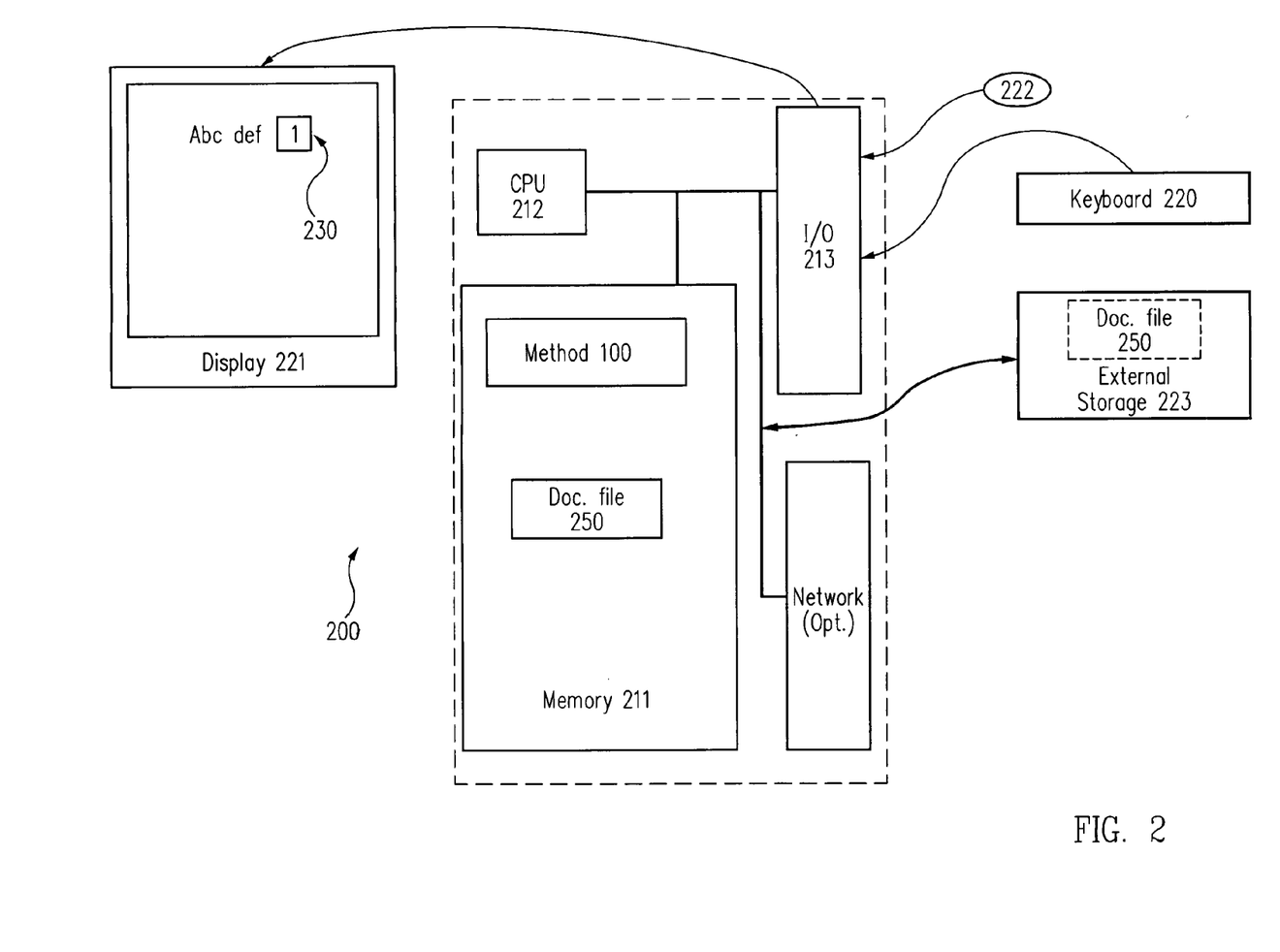
FIG. 2 is a schematic illustration of a computer system for carrying out the present invention.

The user, therefore, can easily input the bibliographic data without taking care of the format, which is determined by a separate dialogue window (not shown) in one embodiment. In operation S5, a reference field 230 (FIG. 2) is inserted into the text document at the position the user wants to have the bibliographic citation appear, as is illustrated in FIG. 2. In operation S6, method 100 checks whether the user has requested to leave the document, or alternatively the user has requested to save the document without leaving the document. If not, method 100 goes back to operation S1. If the user requested to leave the document or save the document, method 100 stores in operation S7 the text data and the bibliographic database in the same data file, i.e., document file 250, on a given storage medium either memory 211 or memory 223, for example, a hard disc of a computer, CD-ROM, or a remote storage medium via the Internet. After storage operation S7, the creation of the text document according to the present invention is completed.

Further, those of skill in the art will appreciate that while memory 211 is illustrated as one unit that can include both volatile memory and non-volatile memory, in most computer systems, memory 211 is implemented as a plurality of memory units. In more general terms, method 100 is stored in a computer-readable medium, and when method 100 is loaded from the computer-readable medium into a memory of a device, the device is configured to be a special purpose machine that executes method 100. Also, herein, a computer program product comprises a medium configured to store or transport computer-readable code for method 100 and/or document file 250, or in which computer-readable code for method 100 and/or document file 250 may be embedded. Some examples of computer program products are CD-ROM discs, ROM cards, floppy discs, magnetic tapes, computer hard drives, servers on a network and signals transmitted over a network representing computer-readable program code.

As indicated above, this storage medium may belong to computer system 200 itself as illustrated in FIG. 2. However, the storage medium also may be removed from computer system 200, and may be connected to computer system 200 via a data line or a network.

Also, in the context of the present invention, computer system 200 may also comprise a server and a client, which share the above described tasks of the computer system among themselves. For example, method 100 may be stored and executed on the server. However, the user input data may be first received by the client, for example, a laptop or handheld computer, an Internet appliance, or a mobile phone, i.e., operation S1 is carried out on the client. The remaining operations can be executed by the server, and then the file saved on either the server or the client device. In view of this disclosure, those of skill in the art can appropriate the tasks between a client and a server to achieve the best performance of method 100 for the given configuration.

More specifically, computer system 200, in one embodiment, can be a portable computer, a workstation, a two-way pager, a cellular telephone, a digital wireless telephone, a personal digital assistant, a server computer, an Internet appliance, or any other device that includes the components shown and that can execute method 100. Similarly, in another embodiment, computer system 200 can be comprised of multiple different computers, wireless devices, cellular telephones, digital telephones, two-way pagers, or personal digital assistants, server computers, or any desired combination of these devices that are interconnected to perform, method 100 as described herein. See, for example, FIG. 3A.

Accordingly, a computer memory refers to a volatile memory, a non-volatile memory, or a combination of the two in any one of these devices, Similarly, a computer input unit and a display unit refere to the features providing the required functionality to input the information described herein, and to display the information described herein, respectively, in any one of the aforementioned or equivalent devices.

In addition, memory 211 may be physically located in a location different from processor 212. The only requirement is that processor 212 is coupled to memory 211. This could be accomplished in a client-server system, or alternatively via a connection to another computer via modems and analog lines, or digital interfaces and a digital carrier line. For example, memory 211 could be in a World Wide Web portal, while display unit 221 and processor 212 are in a personal digital assistant (PDA), or a wireless telephone. Conversely, display unit 221 and at least one of the input devices could be in a client computer, a wireless telephone, or a PDA, while memory 211 and processor 212 are part of a server computer on a wide area network, a local area network, or the Internet.

In view of this disclosure, method 100 can be implemented in a wide variety of computer system configurations. In addition, method 100 could be stored as different modules in memories of different devices. For example, method 100 could initially be stored in a server computer, and then as necessary, a module of method 100 could be transferred to a client device and executed on the client device. Consequently, part of method 100 would be executed on the server processor, and another part of method 100 would be executed on the client device. In view of this disclosure, those of skill in the art can implement the invention in a wide-variety of physical hardware configurations using an operating system and computer programming language of interest to the user.

Moreover, while in FIG. 2, document file 250 is shown as stored in part of the same memory 211 as the memory storing method 100, those of skill in the art will understand that this is illustrative only. Document file 250, in one embodiment, is in a first memory 211B (FIG. 3A) that is coupled to a second memory 211A containing method 100 via a network connection. For example, document file 250 is on a memory of computer 200B, which could be, for example, a file server, while method 100 and processor 212 are located in another device 200C, which could be, for example, a workstation 200C. Computers 200B and 200C are coupled via network 315. Alternatively, document file 250 is in a first memory 211B in first system 200B, method 100 is in another memory 211C in a second system 200C, and processor 212 can be in either first system 200C, second system 200B, or a third system 200A that is different from the first and second systems. The particular configuration of memory 211 used to support method 100 is not essential to this invention.

Figure 3A:
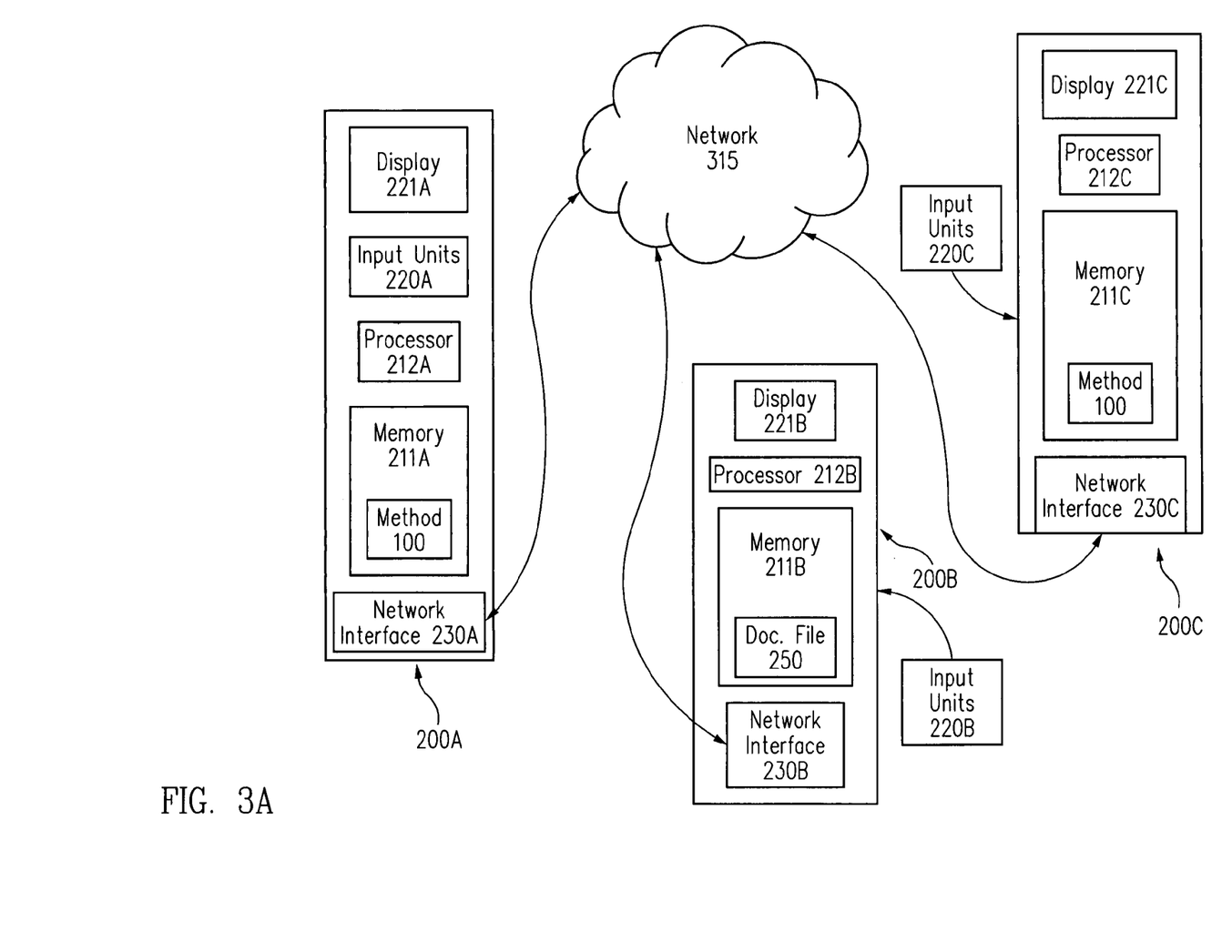
FIG. 3A is a high-level block diagram where the computer system of FIG. 2 is distributed among a plurality of devices that are interconnected via a network.
Figure 3B:
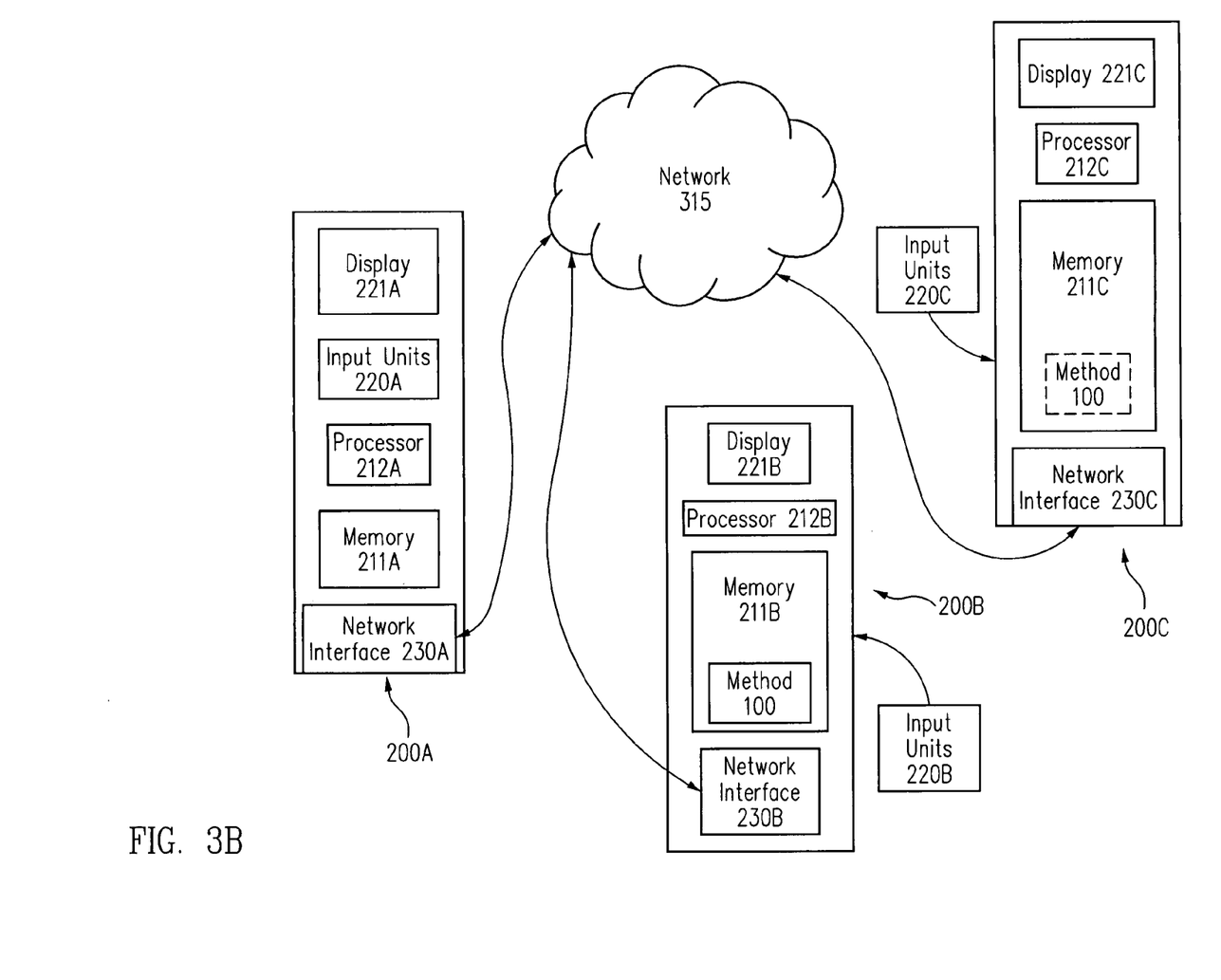
FIG. 3B is a high-level block diagram where the computer system of FIG. 2 is distributed among a plurality of devices, and the method of this invention is transferred from a memory in a first device to a memory in a second device.

In yet another embodiment illustrated in FIG. 3B, method 100 is stored in memory 211B of system 200B. Stored method 100 is transferred, over network 315 to memory 211C in system 200C. In this embodiment, network interfaces 230B and 230C can be analog modems, digital modems, or a network interface card. If modems are used, network 315 includes a communications network, and method 100 is downloaded via the communications network.

Figure 6:
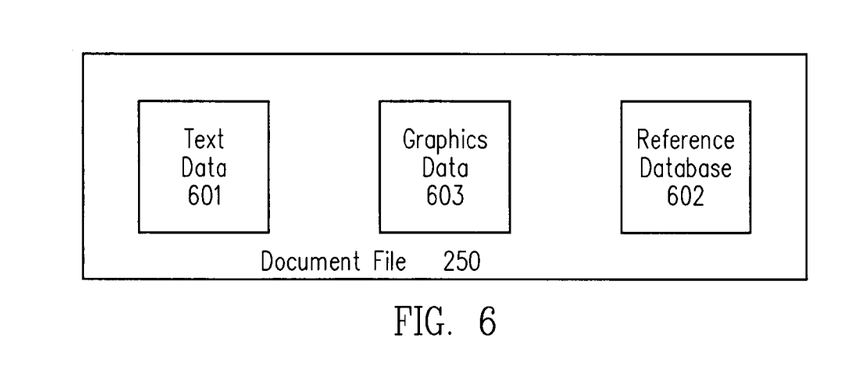
FIG. 6 is a schematic representation of a text document file according to the present invention.

A document file 250 created according to the invention is schematically shown in FIG. 6. In this embodiment, document file 250 contains data 601 including the reference fields, reference database 602, and also contains further data 603, for example, graphics data. Reference database 602 may contain any sort of related data as bibliographic data, related graphics, headword index, etc.

Figure 4:
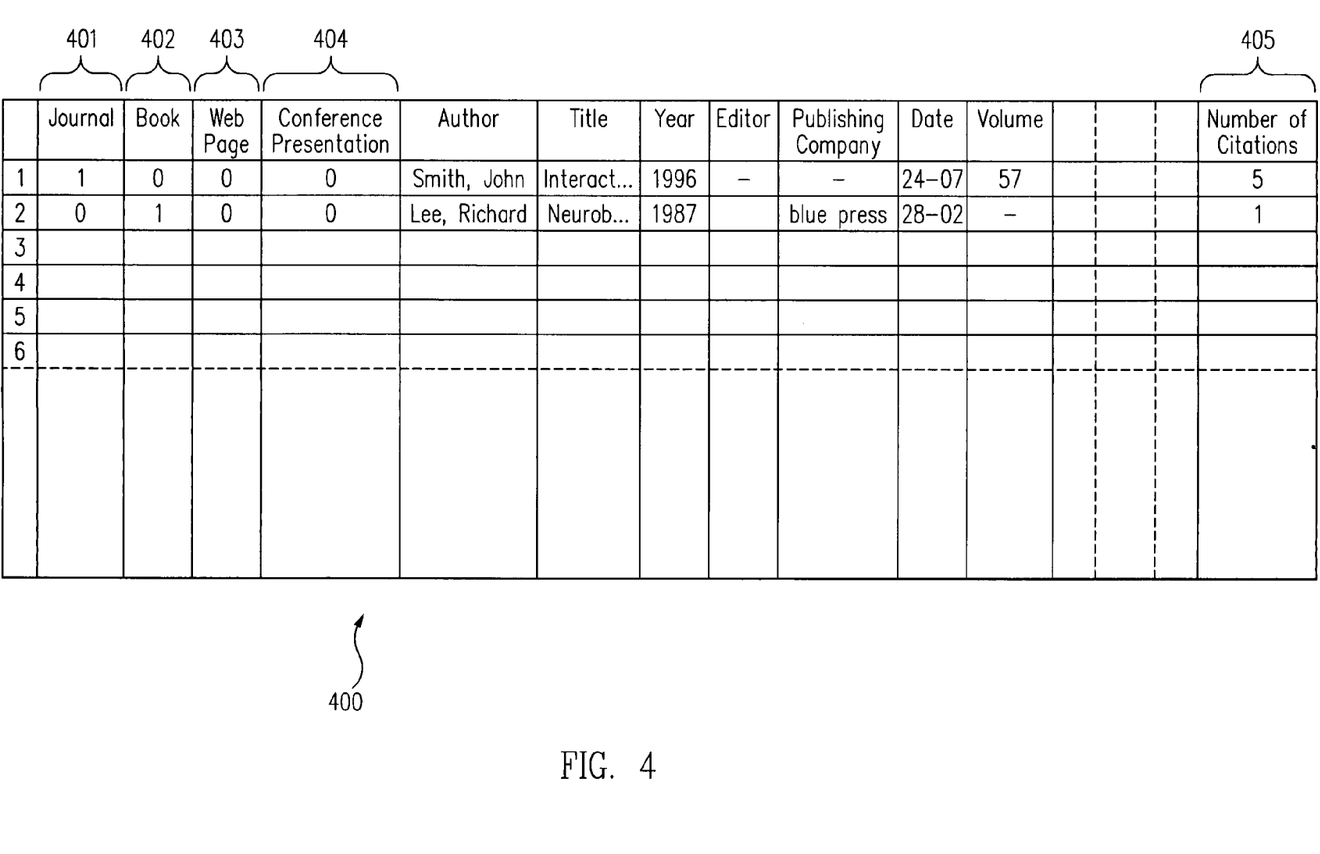
FIG. 4 is a schematic illustration of a table containing bibliographic data of the reference database according to the present invention.
Figure 5:
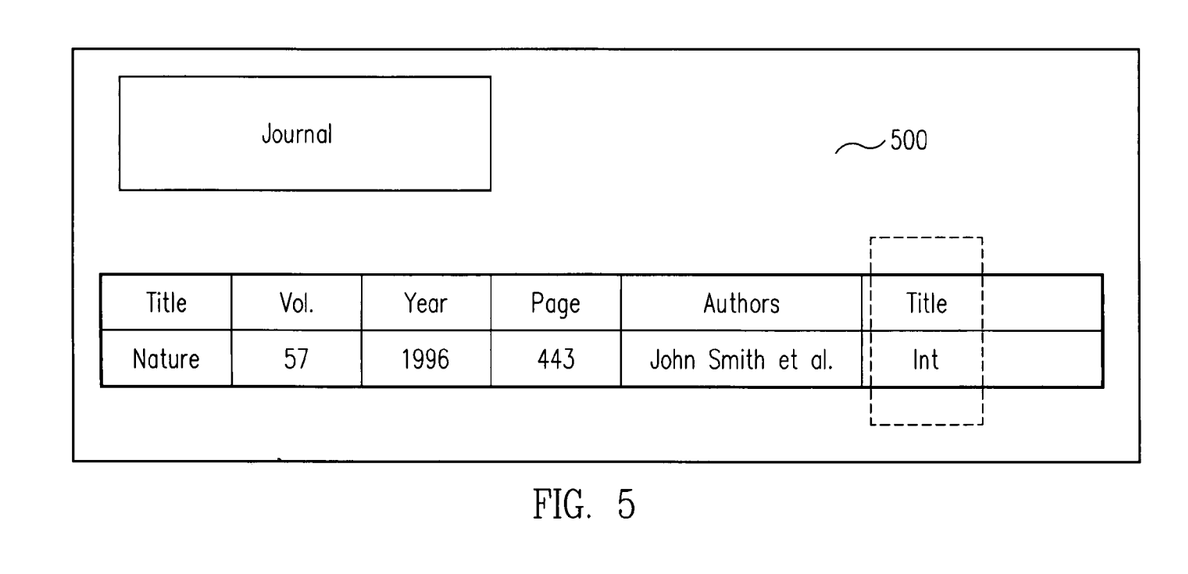
FIG. 5 is an illustration of the user dialogue display window for inputting and/or editing a bibliographic data according to the present invention.

FIG. 4 shows an example of a table structure 400 of the reference information stored in reference database 602. For every different item of reference data, e.g., bibliographic data, that is for every different citation there is provided one row in table 400, i.e., there is one record in reference database 602 for each unique reference in the text document.

In the illustration of FIG. 4, the first four fields 401 to 404 of a row contain bits indicating the type of the reference data source, for example journal, book, web-page or conference presentation. The types of reference data sources, however, are not restricted to these four. In view of this disclosure, those of skill in the art can include any number and type of desired reference sources in table 400.

Item 1 of the bibliographic data record in the example of FIG. 4 is an article in a journal. Thus, bit 1 in row 1 is set in journal field 401 and bits 2 to 4 in row 1 remain cleared in book field 402, web page field 403 and conference presentation field 404, respectively. Fields for the author, the title, the year, the editor, etc. follow the type of reference data source fields in each row. In the last field of each row, the number of citations of the article in the text document is given.

If the user wishes to enter a new item into the bibliographic reference database, in one embodiment, a user launches an interactive dialogue window 500 as shown in FIG. 5. In launching interactive dialogue window 500, he or she can select the desired type of data source, which is then displayed in the dialogue window. In the example shown in the FIG. 5, the user selected a journal and so "Journal" is displayed in window 500. Only fields of table 400 (FIG. 4), which relate to the document type "Journal", are displayed in dialogue window 500, as is illustrated in FIG. 5. The user can then easily enter the bibliographic information. Upon closing window 500, the entered data is stored in table 400.

If he or she cites the same article again, he or she need not enter the bibliographic data once more. The user can simply select the appropriate record in table 400. The bibliographic data can also be entered or updated from an external database, i.e., imported into table 400.

It should be acknowledged here that the invention is not limited to any specific type of document or reference database. Since text data 601 and reference database 602 are stored in the same document file 250 transfer of this single document file 250 to a different location is sufficient to enable a user at that different location to edit the text data as well as the bibliographic data.

Figure 1B:
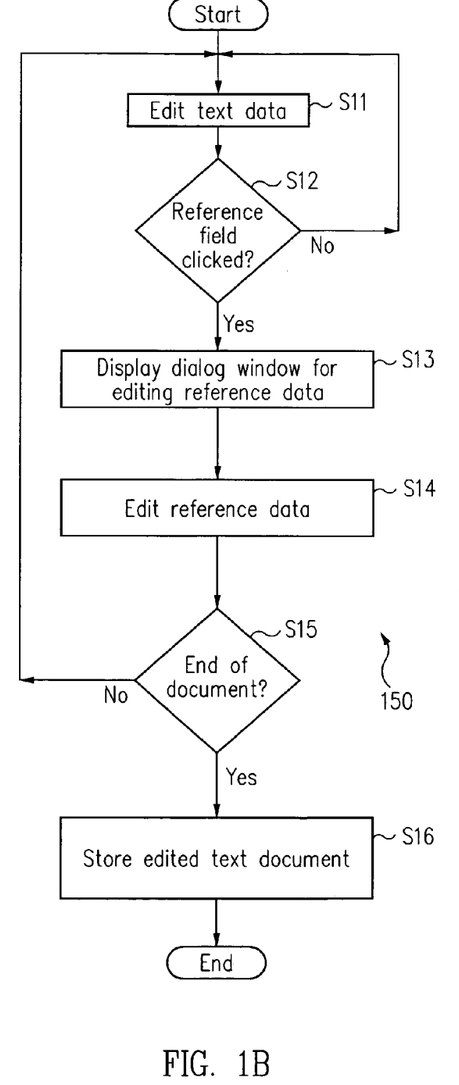
FIG. 1B is a flow chart illustrating the editing operation of text and bibliographic data according to the present invention.

Editing operation 150, according to the present invention, is illustrated in FIG. 1B. In operation S11, the text document is edited using suitable input devices. If a reference field 230 is addressed by a key or a mouse click ("yes" in operation S12), the dialogue window for editing bibliographic data as shown in FIG. 5 is opened in operation S13. The bibliographic data can then be edited in operation S14. If the end of the document is reached in operation S15, the edited text document is then stored in a single file in operation S16. The document file contains the updated text data as well as the updated bibliographic data.

In FIGS. 2, 3A and 3B, the memory that stores method 100 could also store method 150. However, instead of repeating the drawings and the description thereof concerning the execution and storage of method 100 that description is incorporated herein by reference with the reference to method 100 being replaced with method 150 in a first embodiment, and replaced with methods 100 and 150 in a second embodiment.

Figure 7:
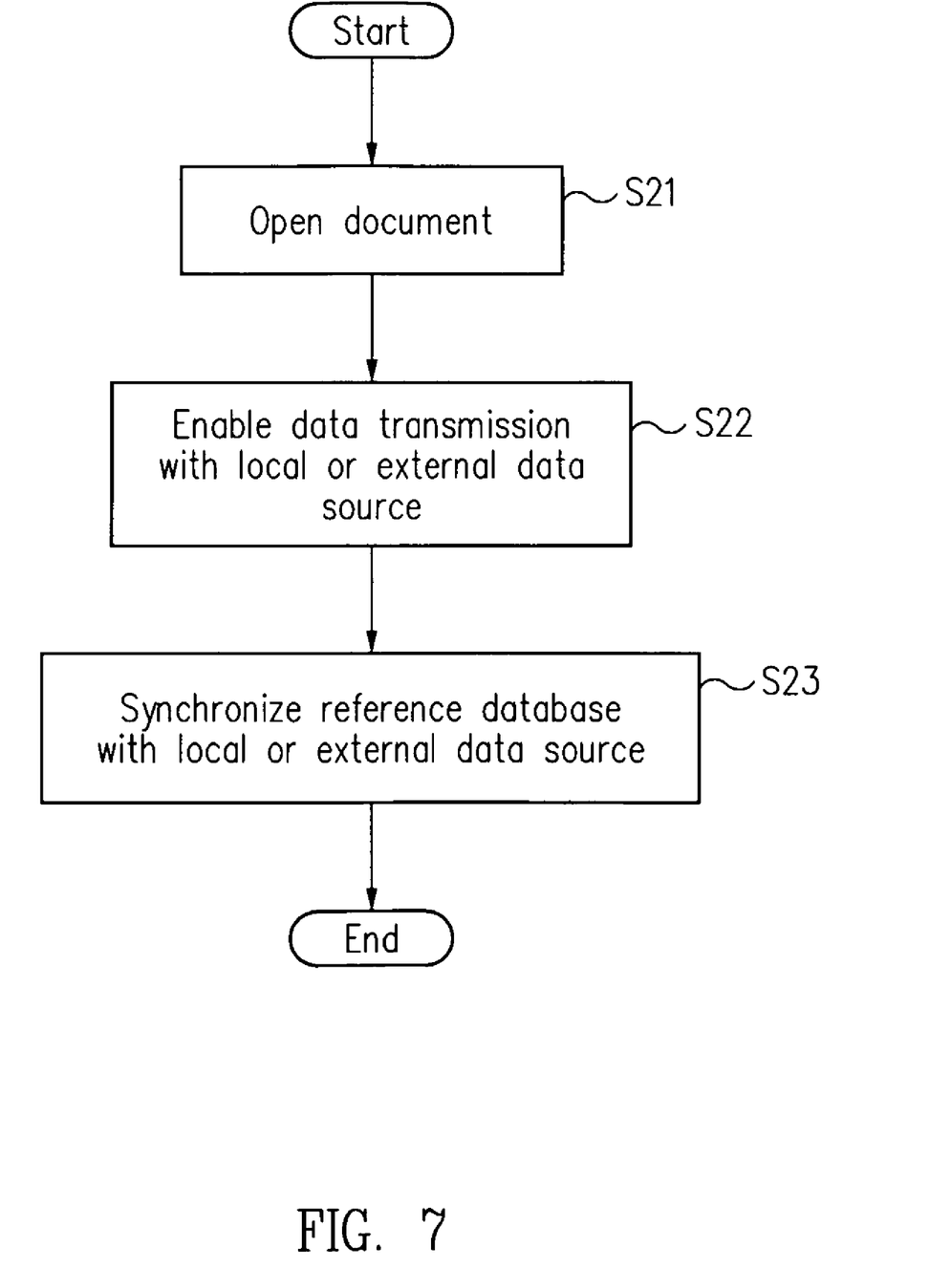
FIG. 7 is a flow chart illustrating the process of synchronizing the document database with another data source.

A further feature of the present invention is now described in connection with the flow chart of FIG. 7. The user may open the document comprising the reference database in an operation S21. Then, in operation S22, a data transmission with a local data source as for example a database on a computer or a remote data source as, for example, a database on an Internet server is enabled via a data transmission link. It is then possible to exchange data between the external data source and the database in the document as shown in operation S23. Preferably, the document database contains the bibliographic data in an Internet compatible format as for example the Z95 standard. With synchronization operation S23, either the document reference database may be updated or completed using the external data source, or the external data source located on a local or remote device may be updated or completed using the document reference database. According to this embodiment, possibilities for updating and completing the document database, as for example a bibliographic database, are greatly improved.

While the invention has been particularly shown with reference to a preferred embodiment thereof, it will be understood by those skilled in the art that various other changes in the form and details may be made therein without departing from the spirit and scope of the invention.

We claim:

1. A method of creating a reference database for a computer-readable document comprising:
   entering user inputted text data for said computer-readable document in a data file;
   determining whether a user inputted a request to input reference data wherein said reference data characterizes a reference data source;
   entering user inputted reference data into the reference database following said determining finding said user inputted said request to input reference data; and
   storing the reference database, said user inputted text data, and other data of the computer-readable document in said data file wherein said other data includes at least one citation to said user inputted reference data.

2. The method of claim 1, wherein the computer-readable document further comprises a reference field for retrieving a record stored in the reference database.

3. The method of claim 1, wherein the reference database further comprises:
   fields for different types of reference data sources; and
   fields containing specific information associated with these different types of reference data sources.

4. The method of claim 3, wherein the reference database comprises a bibliographic database, and the reference data sources comprise books, journals, conference presentations, web-pages and e-mails.

5. The method of claim 4, wherein the reference database further comprises one field containing information about a number of citations of a reference in the document.

6. The method of claim 1, further comprising: displaying a user interactive dialogue window for inputting reference data.

7. The method of claim 1, further comprising:
   synchronizing the reference database with other data sources.

8. The method of claim 1, wherein said method is stored as computer code in a storage medium.

9. The method of claim 8, wherein said computer code is downloaded into said storage medium.

10. An apparatus comprising:
    a processor; and
    a storage medium coupled to said processor, and including a reference database for a computer-readable document, storing user inputted reference data wherein said reference data characterizes a reference data source, together with said computer-readable document including user inputted text data in a single data file wherein said computer-readable document includes at least one citation to information in said reference database.

11. The apparatus of claim 10, wherein said processor is in a first device, and said storage medium is in a second device.

12. A storage medium having stored thereon in a single data file a computer-readable document comprising a reference database storing user inputted reference data, wherein said reference data characterizes a reference data source, user inputted text data and other data of the computer-readable document wherein said other data includes at least one citation to said user inputted reference data.

13. The storage medium of claim 12, wherein the computer-readable document further comprises reference fields.

14. The storage medium of claim 12, wherein the reference database contains fields for different types of reference data sources and fields containing specific information associated with these data sources.

15. A computer program for creating a reference database for a computer-readable document, the computer program comprising program code adapted for:
    entering user inputted text data for said computer-readable document in a data file;
    determining whether a user inputted a request to input reference data, wherein said reference data characterizes a reference data source;
    entering user inputted reference data into the reference database following said determining finding said user inputted said request to input reference data; and
    storing the reference database, said user inputted text data, and other data of the computer-readable document in said data file wherein said other data includes at least one citation to said user inputted reference data.

16. The computer program of claim 15, wherein the computer-readable document comprises a reference field for retrieving a record stored in the database.

17. The computer program of claim 15, wherein the reference database comprises fields for different types of reference data sources, and fields containing specific information associated with these data sources.

18. The computer program of claim 17, wherein the reference database comprises a bibliographic database and the data sources include books, journals, conference presentations, web-pages and e-mails.

19. The computer program of claim 18, wherein the reference database comprises one field containing information about the number of citations of a reference in the computer-readable document.

20. The computer program of claim 15, further comprising instructions for displaying a user interactive dialogue window on a display screen.

21. The computer program of claim 20, comprising computer code allowing synchronization of the reference database with other data sources.

22. A computer program product for creating a reference database for a computer-readable document, the computer program product comprising program code adapted for:
    entering user inputted text data for said computer-readable document in a data file;
    determining whether a user inputted a request to input reference data, wherein said reference data characterizes a reference data source;
    entering user inputted reference data into the reference database following said determining finding said user inputted said request to input reference data; and
    storing the reference database, said user inputted text data, and other data of the computer-readable document in said data file wherein said other data includes at least one citation to said user inputted reference data.

23. The computer program product of claim 22, wherein reference fields are included in other data for retrieving the reference data stored in the reference database.

24. The computer program product of claim 23, further comprising program code allowing synchronization of the reference database with other data sources.

* * * * *